April 18, 1939. R. A. SANDBERG 2,155,062
LEVER CONSTRUCTION
Filed April 8, 1937 2 Sheets-Sheet 1
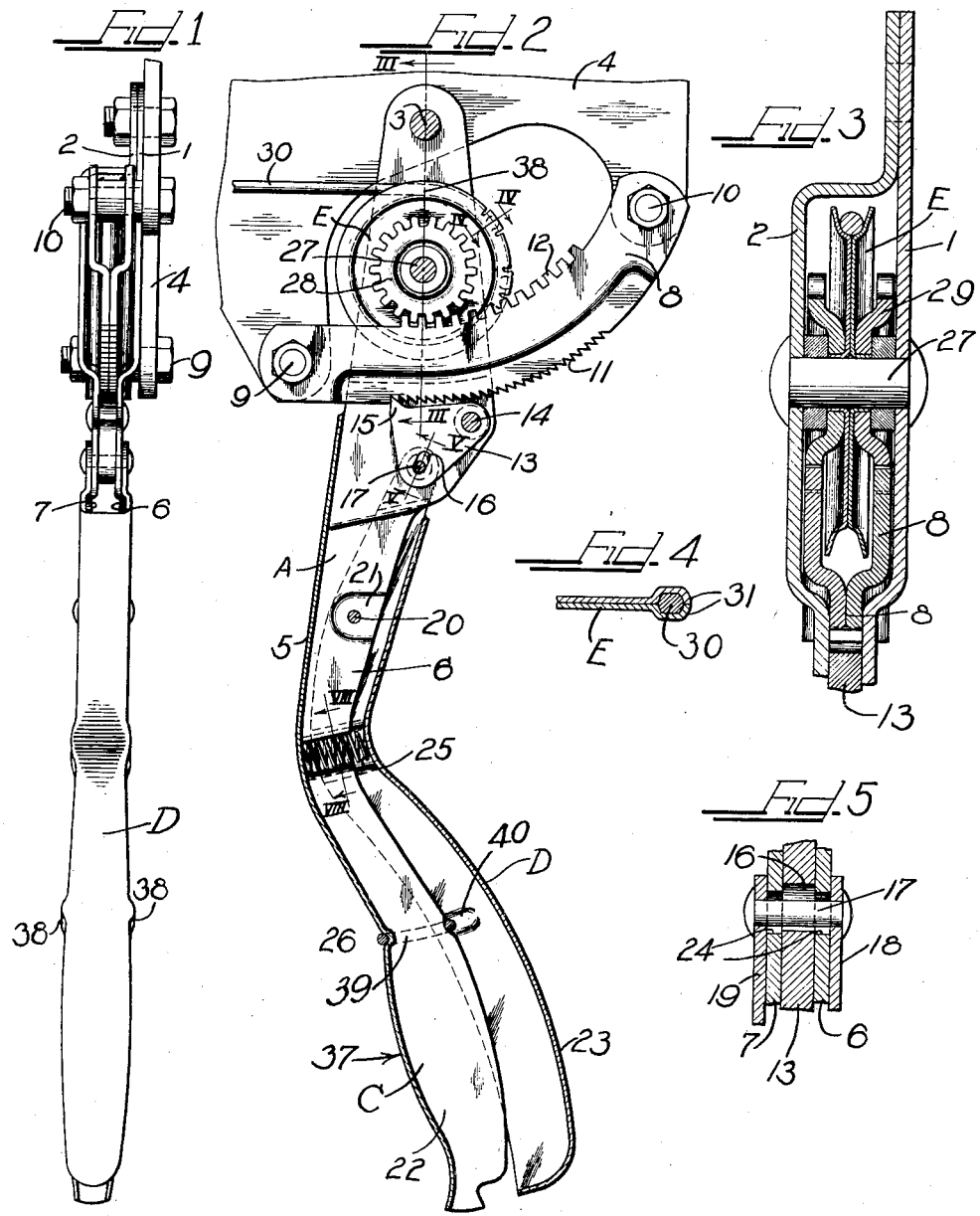
Inventor
RAY A. SANDBERG

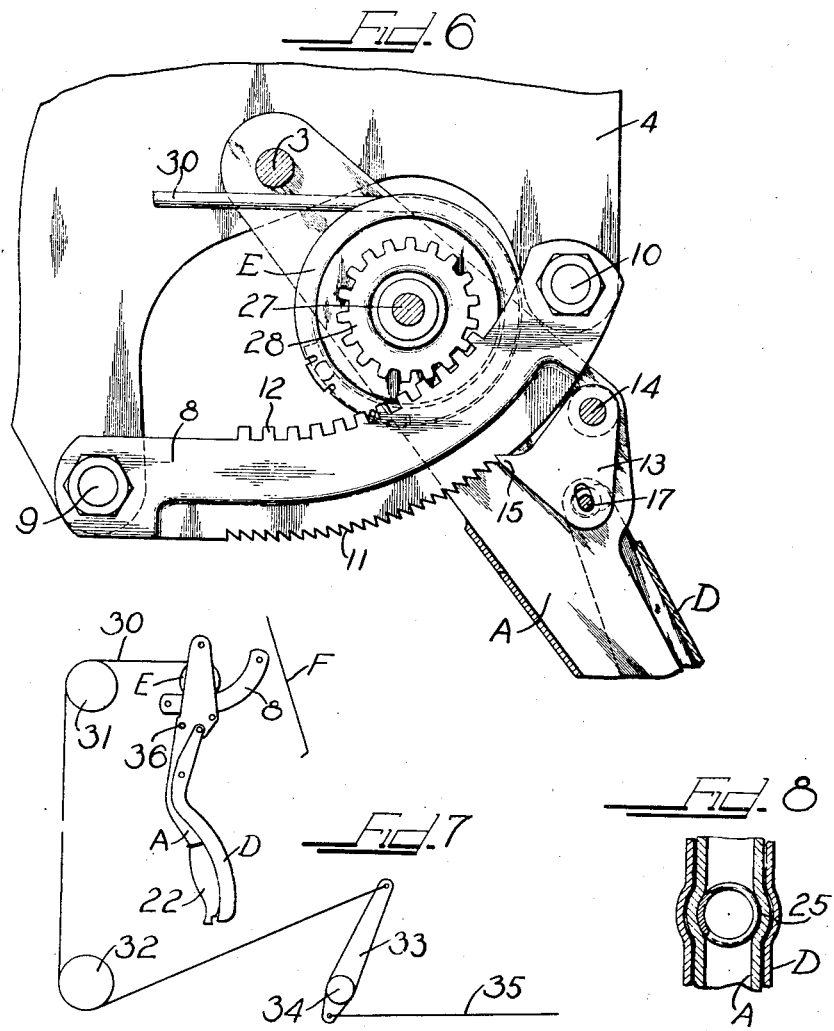

Patented Apr. 18, 1939

2,155,062

UNITED STATES PATENT OFFICE 2,155,062

LEVER CONSTRUCTION

Ray A. Sandberg, Waukegan, Ill., assignor, by mesne assignments, to Houdaille-Hershey Corporation, Detroit, Mich., a corporation of Michigan Application April 8, 1937, Serial No. 135,647

12 Claims. (Cl. 74—530)

The present invention relates to lever constructions, and more particularly to dash type brake lever constructions for automotive vehicles.

At the time that automobile manufacturers applied dash type brake levers to automobiles, for the emergency brakes, the levers were supported behind the instrument boards, with the handles thereof projecting below the lower arced margins of the instrument boards, far enough to be readily grasped by the hands of the vehicle operators to apply the brakes. In order to arrange such levers with the handles in convenient positions, the levers were made shorter than the regular or floor type, with the result that the lever arm effect between the lever and the brake rigging was altered over that present in the automobiles equipped with the regular or floor type emergency brake levers.

Furthermore, because of the fact that the dash type brake levers are limited in their angular swing, because of the proximity of the instrument boards, the amount of travel of the cables connected between the levers and the brake rigging was reduced to a point where, in some instances, the emergency brakes were not fully set when the levers were pulled to limit of travel.

An object of the present invention is to reduce the load on a cable, connected to a brake lever of the dash type at the point where the cable is connected to the lever.

Another object of the present invention is to reduce the load imposed on the pawl, when the lever is latched with the brake set, so that the ratchet tooth life may be prolonged, a finer adjustment between the pawl and ratchet may be achieved, and the resulting brake construction more satisfactory.

A further object of the present invention is to increase the lever arm effect at the brakes, and take up the additional cable travel necessary without increasing the amplitude of angular movement of the dash type brake levers.

Generally speaking, the lever construction of the present invention contemplates the mounting of a winding drum or sheave on the brake lever, connecting the cable to the sheave and giving the sheave rotative movement about its pivotal connection to the lever as the lever is swung in service, thereby increasing the linear travel of the cable over what it is when directly connected to the lever. With such construction, the pull imposed on the cable is increased in its linear extent without increasing the amplitude of angular swing of the lever.

The above, other and further objects of the present invention will be understood from the following description and accompanying drawings.

The accompanying drawings illustrate a lever constructed in accordance with the principles of the present invention and the views thereof are as follows:

Figure 1 is a front elevational view of a dash type brake lever of the present invention, showing the same attached to its mounting support or plate, and in "off" position.

Figure 2 is a view, partially in elevation and partially in longitudinal central section, of the lever of Figure 1, showing the parts with the lever in "off" position.

Figure 3 is an enlarged vertical sectional view taken substantially in the plane indicated by the line III—III of Figure 2.

Figure 4 is an enlarged sectional view taken substantially in the plane indicated by the line IV—IV of Figure 2.

Figure 5 is a fragmental enlarged sectional view taken substantially in the plane indicated by the line V—V of Figure 2.

Figure 6 is a fragmental view, partially in side elevation and partially in section, showing the relationship of the parts when the lever has been swung to the limit of its amplitude of movement in brake setting direction.

Figure 7 is a diagrammatic view, showing the connection of the pull cable to the lever and to an arm of the brake rigging.

Figure 8 is an enlarged sectional view taken substantially in the plane indicated by the line VIII—VIII of Figure 2.

The drawings will now be explained:

The illustrated form of brake lever includes a brake lever body A stamped from flat metal to provide legs 1 and 2 at its upper end for pivotal connection at 3 to a suitable support, such as a plate or bracket 4. The major portion of the length of the lever body member A is channel-shaped in cross-section forming a web 5 and side walls 6 and 7. Preferably, the lower end of the lever is bent so that the handle portion C of the same may project in a direction outwardly of the lower margin of the instrument board in position to be readily grasped by the vehicle operator.

The support 4 carries a rack 8 which may be made as an integral part of the bracket 4 or as a separate part, as shown, secured thereto by bolts 9 and 10. Preferably, the rack 8 is formed as a stamping, comprising two halves or parts, with its lower margin provided with ratchet teeth 11, and its upper arcuate margin provided with rack teeth 12. A pawl 13 is pivoted at 14 to the lever body A, and has a point 15 adapted to latch with any of the ratchet teeth 11 of the rack sector 8. The pawl is provided with an elongated slot 16 to receive a pin 17 which is carried by the upper ends of the side walls 18 and 19 of a stamped, channel-shaped latch-release member D. The side walls of the latch-release member D are illustrated as overlapping the side walls of the lever body A, although the parts could be interchanged with the side walls of the body A overlapping the side walls of the latch-release member, without affecting the mode of operation of the lever construction.

The latch-release member is pivoted at 20 to the lever body A, which pivotal point is nearer the pawl 13 than the grip end of the lever. The walls 6 and 7 of the lever body A may be inwardly depressed as at 21 to thereby permit pivotal connection with the latch release member without forming bulges or projections in the walls of the release member D.

The grip portion 22 of the lever body A is slightly convex in its web portion to form a convenient and smooth grip for the operator's hand. The grip portion 23 of the latch-release member is likewise rounded for a similar purpose. The walls 6 and 7 of the lever body A are slotted as at 24 to allow movement of the pin 17 incidental to actuation of the pawl 13.

A spring 25 is interposed between the webs of the lever body A and the latch-release member D for normally holding the latch-release member D in one position and the pawl 13 in latched engagement with the ratchet portions of the sector 8. In order to prevent rattling between the lever body A and the latch-release member D, the walls and web of the lever body are depressed at 39, and a rubber washer applied to the depression which thus serves as anti-rattle means. The walls of the latch release member D may be dished outwardly, as at 40, to receive the washer 26 and to permit easy movement of the latch-release member D with respect to the lever body A.

Pivoted to the legs 1 and 2 of the lever body, between the lever pivot 3 and the rack 12 of the sector 8, by means of a pivot pin 27, is a drum or sheave E which is preferably fashioned from metal by suitable stamping processes, and on each side of the sheave are pinions 28 and 29 which mesh with the rack teeth 12 of the sector 8. As may be observed in Figure 3, the sector 8 is fashioned from stamped metal to provide two racks on each side of the sheave E.

It will be observed that the diameters of the pinions are less than the diameter of the sheave. This construction is for the purpose of increasing the power effect as the lever is swung to accelerate the rotative movement of the sheave as the lever is swung about its pivot.

A pull cable 30 is connected at one end to the sheave E in any suitable manner. Figures 2 and 4 show one means for securing the cable to the sheave which consists in notching the peripheral portions of the trough of the sheave and bending over certain of these portions at 31 to squeeze the cable against accidental removal from the sheave. It is to be understood that the cable might be fastened in any other manner that is satisfactory for the purpose.

As may be readily observed, as the lever is swung from "off" position, which is that of Figure 2, to "set" position, which is that of Figure 6, the sheave is rotated about its axis 27 in angular direction counter to the direction of angular swing of the lever. In moving the lever to apply the brakes, the sheave is rotated clockwise, as viewed in Figures 2 and 6, and in counter-clockwise direction when the lever is swung from "set" position to "off" position. Therefore, the linear travel of the cable 30 is greater than it would be were it directly connected to the lever, as is common practice with dash levers of the present type.

Because of the limited space available for mounting of dash type levers behind instrument boards of automotive vehicles, the amplitude of swing of the levers is anywhere from 40 to 45 degrees. Referring to Figures 2 and 6, it will be observed that the sheave E, as the lever is moved from the position of Figure 2 to the position of Figure 6, which in the drawings is 45 degrees, rotates substantially 180 degrees, or roughly speaking, a ratio of substantially 4 to 1.

Figure 7 illustrates diagrammatically the lever mounted behind an instrument board, represented at F. As before stated, the bend in the lever is such as to bring it against the lower margin of the instrument board when the lever is in "set" position. The cable 30 is shown as passing over an upper pulley 31 which is suitably secured to the partition or fire wall between the engine compartment and the passenger compartment of a vehicle. The cable passes downwardly over another pulley 32, and thence rearwardly to what is herein illustrated as an arm 33 secured to an equalizing rod 34 extending crosswise of the chassis of the vehicle. The cable is shown as attached to the upper end of the arm 33. To the lower end of the arm 33 is attached another cable or cables, or a rod 35, to the brake manipulating arms of the brakes on the various wheels of the vehicle. The arm 33 is illustrated in the proportion of 4 to 1.

It will be observed that to swing the upper end of the arm 33 far enough to set the brakes requires a cable travel in excess of that possible where the cables are directly connected to the lever at some point, such as the point 36 of Figure 7. By reason of the utilization of the rolling sheave E, the pick-up of the cable in brake-setting direction is greater than it would be if directly connected to the lever. Consequently, by a lever swing of not in excess of 45 degrees, the cable 30 is pulled far enough to properly set the brakes, which are actuated by the swing of the arm 33 of the equalizer bar 34.

When the lever is swung from "set" position to "off" position, the sheave E rotates in counter-clockwise direction, as viewed in Figures 2 and 6, thereby causing movement of the cable in reverse or counter-direction at a rate of linear movement which is greater than that of the angular swing of the lever.

As exemplary of the differential movement of pull of the cable with respect to angular swing of the lever, an example is cited as follows:

For the sake of explanation, let it be assumed that the distance from the axis of the lever pivot 3 to the point of the grip portions of the lever where pulling effect is applied, such, for example, as the point indicated by the reference character 37 in Figure 2, is 14 inches. The distance from the axis of the lever pivot 3 to the center line of the cable 30, at the point 38 of Figure 2, is one inch.

In some automobiles as constructed at the present time, in order to properly set the emergency brakes, a pulling effort of at least three hundred pounds is necessary to be applied to the cable or rod 35 of the rigging. Assuming then that the 4 to 1 arm 33 of Figure 7 were utilized, then the amount of pull necessary to be applied to the upper end of the arm 33 will be in the neighborhood of one hundred pounds.

In all cases of levers, the relation between the force exerted or the pull P, and the load lifted or resistance overcome W, is expressed by the equation P × AC; W × BC, in which AC is the lever arm of P, and BC is the lever arm of W.

For the purpose of explanation, and to illustrate how the load is concentrated on pivot pin 27, assume that the load on the cable 30 is 100 pounds, and that the pawl is disengaged from the sector tooth that will balance the cable load. The forces acting on the pulley or sheave will, therefore, be the load on the cable, (100 pounds) the reaction between the teeth of the wheel or gear 28 and the teeth of the ratchet 12, in addition to the reaction at the axis of rotation of the pivot pin 27, at which point eventually it can be assumed there is a single force acting, as this is a pin connected joint. The single force acting at this point 27 is therefore equal to the vectorial summation of the forces acting on cable 30 and the reaction on the teeth of the rack 12 produced by engagement therewith of the wheel 28.

In order to determine the force concentrated on pin 27, it may be assumed that the distance from the lever pivot 3 to the center line of the cable is one inch, the distance from the center line of the cable to the axis of pin 27 is one and one-quarter inches, the distance from the axis of the pin 27 to the pitch line of the sheave E and ratchet or rack teeth is three-quarters of an inch, and that the line of contact of the pawl with the ratchet is one and fifteen-sixteenths inches from the axis of the pin 27.

Applying the law of levers, we have an equation $100 \times 1\frac{1}{4} = W \times \frac{3}{4}$, in which W represents the action and equal and opposite reaction on the pitch line of the teeth of the sheave 28 and the teeth 12. Solving this equation we have W equal to 166.6 pounds.

Inasmuch as stated above, the system of forces may be placed in balance by the action of a single force acting through the pin 27, because of the construction of this lever, such force will be equal to 100 pounds, the force acting on the cable plus the vectorial reaction of the ratchet teeth 12 of 166.6 pounds, giving a total force of 266.6 pounds which, if made to act through the pin 27, will determine the action and reaction at the point of engagement of the pawl tooth 15 with a tooth of the sector 11.

In order to determine the pawl load, let it be assumed that the line of contact of the pawl and ratchet is one and fifteen-sixteenth inches, from the axis of the pin 27, as before stated, where for the purpose of computation a force of 266.6 pounds will be assumed as concentrated, such force doing equivalent work for a load of 100 pounds on the cable 30 and the vectorial reaction between the ratchet wheel or pinion 28 and the teeth 12. Utilizing the equation for levers, we then have 266.6 pounds $\times 2\frac{1}{4}'' = W' \times 4.19''$, solving we have W'=143.3 pounds.

To determine the amount of pulling force which must be exerted by the operator, to set the brakes, by a pull centralized on point 37 of the grip portion of the lever, to counterbalance the 100 pound load on the cable 30, the whole of the lever system swings about the fulcrum point 3. Utilizing the concentrated force of 266.6 pounds acting through pin 27, the following equation is present, $P \times 14 = 266.6 \times 2\frac{1}{4}$, in which P represents the hand pull of the operator, 14 the lever arm from the point 37 to the fulcrum point 3, and 2¼ the distance between the fulcrum point 3 and the axis of the pin 27. Solving, P=42.8 pounds.

The lever construction of the present invention makes possible efficient braking action for automotive vehicles—where a force of as much as 300 pounds is required at the brake drums—by hand exerted pull at the brake lever of but a fractional part of that at the brake drums. Also, because the pawl load is—in the present invention—less than the total force at the axis of the pin 27, the ratchet teeth may be reduced in size, with a consequent reduction in manufacturing cost and a prolongation of the life of the ratchet teeth.

The invention has been described herein more or less precisely as to details, yet it is to be understood that the invention is not to be limited thereby, as changes may be made in the arrangement and proportion of parts, and equivalents may be substituted without departing from the spirit and scope of the invention.

The invention is claimed as follows:

1. A dash type brake lever construction including in combination, a support, a lever pivoted to said support to swing, said support and lever having cooperating ratchet and pawl means to latch said lever in desired position, an arcuate rack connected to said support, a pinion pivoted to said lever and meshing with said rack, a sheave connected to said pinion to move with it, a flexible tension member or cable secured at one end to said sheave to be wrapped about and unwrapped from it, the construction being such that any swing of said lever will cause rotative movement of the pinion and sheave in counter-angular direction and also bodily movement of the pinion and lever in the direction of lever swing, to thereby accelerate the wrapping or unwrapping of the cable with respect to the sheave and increase the linear travel of the cable over what it would be if directly connected to the lever.

2. In a dash type brake lever construction for automotive vehicles, in combination, a support, a lever pivoted to said support to swing, said support and lever having cooperating ratchet and pawl means for latching said lever in desired position, a sheave pivoted to said lever, a pull cable connected to said sheave for winding and unwinding with respect to the same, and connections between said sheave and said support for rotating said sheave about its pivot at a greater angular rate than the rate of angular swing of said lever to move the cable a greater linear distance than it would move if directly connected to the lever.

3. In a dash type brake lever construction for automotive vehicles including, in combination, a lever pivoted to swing between fixed limits, clutch means for latching said lever in desired position between said limits, a sheave pivoted to said lever, a cable partially wrapped around said sheave and having an end fixed to it, and means for rotating said sheave to wrap said member around it as the lever is swung towards one limit and unwrap said cable from said sheave as the lever is swung in counter-direction, the construction being such that the peripheral speed of rotation of the sheave is greater than the amplitude of swing of the lever to cause said cable to move a linear distance greater than the amplitude of swing of the lever.

4. A dash type brake lever construction for automotive vehicles including, in combination, a lever pivoted to swing between fixed limits, a pawl carried by said lever, a fixed ratchet engageable by said pawl, a fixed arcuate rack, a pinion pivoted to said lever and meshing with said rack, a sheave connected to said pinion and rotatable with it, and a cable connected to said sheave for wrapping and unwrapping with respect to the same as the sheave is rotated in accordance with the angular swing of the lever in to and fro manner.

5. In a dash type brake lever construction for automotive vehicles, in combination, a lever pivoted to swing about an immovable point, a fixed rack, a pinion pivoted to said lever for meshing with said rack, a sheave connected to said pinion to rotate with it, the angular swinging movement of said lever causing rolling movement of said pinion and sheave along said rack at a rate greater than the rate of angular swing of the lever, and a flexible cable connected to said sheave to wrap around and unwrap from the same as the lever is swung, the construction being such that the rate of linear movement of said cable is greater than the rate of swing of the lever to thereby increase the distance traveled by said cable by an amount proportionate to the extent of lever swing.

6. A dash type brake lever construction including a lever pivoted to swing about an immovable point, means for latching said lever in desired position, a flexible cable connected to the brake rigging, a sheave mounted on said lever, said cable being connected to said sheave, and means effective when said lever is swung to set the brakes to actuate said sheave to pull said cable at a greater rate of speed than the speed of swing of the lever.

7. A dash type brake lever construction for automotive vehicles including a lever pivoted to swing about an immovable pivot, means for latching said lever in desired position, a flexible cable connected to the brake rigging, a sheave mounted on said lever and to which said cable is connected, and means effective when said lever is swung to set the brakes to actuate said sheave to pull said cable a greater linear distance than it would be pulled if directly connected to said lever with the same amplitude of lever movement.

8. An automotive vehicle emergency brake lever construction comprising a stamping forming a lever member of channel shape profile for the major portion of its length and with forked legs at one end and a hand grip portion at the other end, said legs being apertured at their ends for a pivot and being laterally bulged between their apertured ends and the lever shank, a sheet metal sheave having a grooved periphery and having stamped pinions secured to each side of said sheave in driving relation pivoted to said lever member within and between the bulged portions of said legs, a rack bar extending between said bulged legs and comprising two similar stamped halves having concave arcuate margins with teeth for meshing with said pinions and having an arcuate convex margin provided with ratchet teeth, the halves along the concave margins being laterally spaced to receive the sheave between them, a cable, portions of the sheave groove flanges being clamped against said cable to secure it to the sheave, a pawl pivoted to said lever member in position to latch with a ratchet tooth to hold said lever member in adjusted position, a stamped manipulating member pivoted to said lever member for releasing the pawl from latched engagement with the ratchet and spring means acting against said actuating member for normally maintaining said member in one position and said pawl in latched engagement with the ratchet.

9. In combination a rack and ratchet member comprising two complemental stampings with two opposite margins arcuately shaped, the stampings being assembled with the portions of the halves along the convex margin in surface contact and with said margin provided with ratchet teeth, said halves along the concave margins being laterally spaced with said margins provided with teeth constituting a double track rack, a cable sheave comprising two complemental stampings secured together to form a hub portion and a grooved periphery, pinions comprising two complemental stampings having teeth on the peripheries thereof and secured to said sheave with a pinion on each side thereof and arranged so that the pinions mesh with and travel along the concave margins of the first mentioned member and with the sheave between said margins.

10. A lever member comprising a stamping forming a hollow shank and grip portion of channel shape profile having parallel legs at one end, the walls of said shank portion being extended to form said legs, said legs being in flatwise contact at their extremities and apertured for a pivot, the legs between said extremities and lever shank being bulged outwardly of the surface of the shank, a supporting plate, said lever being pivoted to said plate at the extremities of said legs, a bar connected at its ends to said plate and extending through and between the bulged legs of said lever member, said bar being fashioned to provide an arcuate margin which is concave and provided with teeth constituting a rack and also formed with a convex margin provided with ratchet teeth, a sheave pivoted to said lever member between said bulged legs, stamped pinions secured to the opposite spaces of said sheave and in mesh with said rack, the sides of said bar along the concave margins of the same being laterally spaced to provide a groove to receive the sheave.

11. In combination, a rack bar comprising a member formed to provide a longitudinally extending groove for a sheave, the margins of said groove having teeth constituting parallel racks, and a sheave movable along the groove of said bar, said sheave having pinions on each side thereof in mesh with said parallel racks, and the diameter of said pinions being less than the diameter of the sheave.

12. An automotive vehicle emergency brake lever construction including a supporting plate, a stamped lever member pivoted at one end to said plate, a sheave pivoted to said lever, pinions of less diameter than the sheave secured to the sides thereof in driving relation, a rack bar comprising two similar stamped halves with like margins concave and provided with teeth for meshing with the pinions which margins are laterally spaced to receive the sheave between them, the opposite margins of said halves being provided with ratchet teeth and with said halves in surface contact along said convex margins, said rack bar being removably attached at its ends to said plate, a pawl pivoted to said lever member in position to latch with the ratchet tooth, and spring urged means operatively connected with said pawl to normally maintain it in latched engagement with the ratchet and operative to unlatch the pawl from the ratchet.

RAY A. SANDBERG.